(12) United States Patent
Ganti et al.

(10) Patent No.: US 11,132,214 B2
(45) Date of Patent: Sep. 28, 2021

(54) LEVERAGING A SHARED STORAGE POOL TO MANAGE THE HEALTH OF VIRTUAL MACHINES

(71) Applicant: INTERNATIONAL BUSINESS MACHINES CORPORATION, Armonk, NY (US)

(72) Inventors: Veena Ganti, Austin, TX (US); Rui Yang, Austin, TX (US); James A. Pafumi, Leander, TX (US); Ravi A. Shankar, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 16/182,879

(22) Filed: Nov. 7, 2018

(65) Prior Publication Data

US 2020/0142726 A1    May 7, 2020

(51) Int. Cl.
*G06F 9/455*    (2018.01)

(52) U.S. Cl.
CPC ............ *G06F 9/45558* (2013.01); *G06F 2009/45579* (2013.01); *G06F 2009/45591* (2013.01)

(58) Field of Classification Search
CPC ........ G06F 9/45558; G06F 2009/45591; G06F 2009/45579
See application file for complete search history.

(56) References Cited

U.S. PATENT DOCUMENTS

| | | | |
|---|---|---|---|
| 8,966,318 B1 * | 2/2015 | Shah | G06F 11/3664 714/41 |
| 10,133,619 B1 * | 11/2018 | Nagpal | G06F 11/079 |

* cited by examiner

*Primary Examiner* — Sisley N Kim
(74) *Attorney, Agent, or Firm* — Cantor Colburn LLP; David Quinn (57) ABSTRACT

A system for monitoring the health of virtual machines associated with a shared storage pool (SSP) includes a plurality of virtual machines (VMs), two or more virtual input/output servers (VIOSes) participating in the SSP, and an orchestration node. Each VIOS in the SSP is associated with a respective set of VMs of the plurality of VMs. Each VM is configured to transmit respective health data describing the VM to its associated VIOS. The orchestration node is in communication with each of the two or more VIOSes participating in the SSP, where each VIOS is configured to transmit to the orchestration node the respective health data of each VM in the respective set of VMs associated with the VIOS. The orchestration node is configured to monitor the health of a plurality of VMs associated with the two or more VIOSes participating in the SSP.

15 Claims, 3 Drawing Sheets

LEVERAGING A SHARED STORAGE POOL TO MANAGE THE HEALTH OF VIRTUAL MACHINES

BACKGROUND

The present invention relates to virtual machines and, more specifically, to leveraging a shared storage pool to manage the health of virtual machines.

A virtual machine (VM) is an emulation of a computer system, and generally multiple VMs can run on a host machine, such as a server. The host machine uses a hypervisor to manage the virtual machines, each of which may be a logical partition of the host machine. A virtual input/output server (VIOS), which is a specialized logical partition, manages physical input resources and output resources among VMs with which the VIOS is connected. These input/output (I/O) resources include, for example, network adapters, small computer serial interface (SCSI) adapters, and fibre channel adapters. In other words, a VIOS manages virtual I/O devices for the VMs with which the VIOS is associated.

One or more VIOSes can participate in a shared storage pool (SSP). The SSP feature bridges the gap between storage virtualization and server virtualization. An SSP provides a highly integrated server-based storage virtualization, by distributing storage across clustered VIOS partitions. More specifically, the SSP can include a set of disks, each of which is connected to the VIOSes in the SSP cluster. The VIOSes can distribute disk space and other resources to their associated VMs as needed, thus enabling efficient sharing of resources across the VMs. The SSP feature can improve the usage of available storage, simplify administrative tasks, and simplify the aggregation of disks among the VIOS partitions.

SUMMARY

Embodiments of the present invention are directed to a system for monitoring the health of virtual machines associated with a shared storage pool. A non-limiting example of the system includes a plurality of virtual machines (VMs), two or more virtual input/output servers (VIOSes) participating in a shared storage pool (SSP), and an orchestration node. Each VIOS in the SSP is associated with a respective set of VMs of the plurality of VMs. Each VM is configured to transmit respective health data describing the VM to its associated VIOS. The orchestration node is in communication with each of the two or more VIOSes participating in the SSP, where each VIOS is configured to transmit to the orchestration node the respective health data of each VM in the respective set of VMs associated with the VIOS. The orchestration node is configured to monitor the health of a plurality of VMs associated with the two or more VIOSes participating in the SSP.

Embodiments of the present invention are directed to a computer-implemented method for monitoring the health of virtual machines associated with a shared storage pool. A non-limiting example of the computer-implemented method includes receiving, at an orchestration node, from two or more virtual input/output servers (VIOSes) participating in a shared storage pool (SSP), a respective set of health data from each VIOS describing a respective set of virtual machines (VMs) associated with the VIOS. The respective set of health data received from a first VIOS describes two or more VMs associated with the first VIOS. The orchestration node monitors the health of a plurality of VMs associated with the two or more VIOSes participating in the SSP.

Embodiments of the invention are directed to a computer-program product for monitoring the health of virtual machines associated with a shared storage pool, the computer-program product including a computer-readable storage medium having program instructions embodied therewith. The program instructions are executable by a processor to cause the processor to perform a method. A non-limiting example of the method includes receiving, at an orchestration node, from two or more virtual input/output servers (VIOSes) participating in a shared storage pool (SSP), a respective set of health data from each VIOS describing a respective set of virtual machines (VMs) associated with the VIOS. The respective set of health data received from a first VIOS describes two or more VMs associated with the first VIOS. Further according to the method, the orchestration node monitors the health of a plurality of VMs associated with the two or more VIOSes participating in the SSP.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, there can be numerous VMs running on a server at a given time, and each VM may be running one or more applications that are needed by end users. When a VM fails, users can be impacted due to those applications becoming unavailable. Conventionally, the health of each VM is monitored individually, which is inefficient and therefore unlikely to result in a high-availability solution to end users.

Turning now to an overview of the aspects of the invention, one or more embodiments of the invention address the above-described shortcomings of the prior art by leveraging SSP for the purpose of collecting and analyzing health data related to the VMs. In some embodiments of the invention, various VMs are associated with respective VIOSes, each of which is participating in an SSP. Each VM may communicate information about its health, such as a heartbeat, to its associated VIOS, which may gather information from all its VMs and transmit that information to a centralized orchestrator associated with the SSP. Thus, through the use of the SSP, the orchestrator collects health information from the various VMs associated with multiple VIOSes. This health information may be used to monitor the health of the VMs and, as needed, to take remedial action based on established policies.

The above-described aspects of the invention address the shortcomings of the prior art by monitoring VMs through leveraging an SSP. Using the existing connections between VIOSes and VMs and among VIOSes due to the SSP, embodiments of the invention provide a centralized mechanism for monitoring VMs and remediating detected issues. With embodiments of the invention, VMs are monitored dynamically in a manner that provides high availability to end users.

Figure 1:
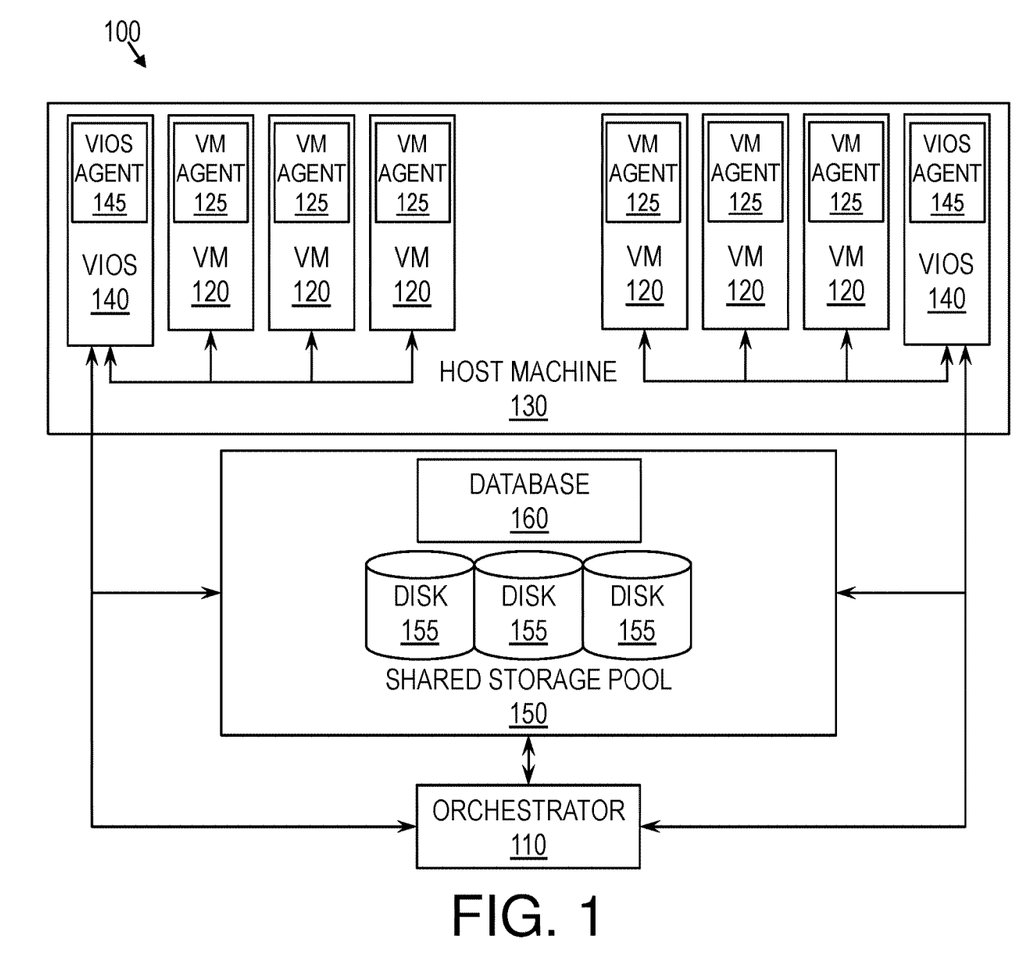
FIG. 1 is a diagram of a remediation system according to some embodiments of this invention.

Turning now to a more detailed description of aspects of the present invention, FIG. 1 is a diagram of a remediation system 100 according to some embodiments of this invention. Through the remediation system 100, an orchestrator 110, also referred to as an orchestration node, monitors a plurality of VMs 120 and initiates remedial actions as needed. Each VM 120 may be a logical partition (LPAR) or another form of VM 120. The various VMs 120 may run on a host machine 130, such as a server. In some embodiments of the invention, a VIOS 140, also referred to as a VIOS partition, is a specialized logical partition that manages I/O resources for one or more VMs 120 running over the same host machine 130. A shared resource pool 150 may include one or more disks 155 or portions thereof, usable by the various VIOSes 140. In some embodiments of the invention, each VM 120 to be monitored by the remediation system 100 is associated with, and therefore in communication with, a VIOS 140 that participates in the SSP 150.

In some embodiments of the invention, the SSP 150 includes a database 160, also referred to as the SSP database 160. This database 160 may be used for various purposes, such as those related to management of allocation of the disks 155 of the SSP 150. For example, and not by way of limitation, the database 160 may be stored on one or more of the disks 155. For instance, the database 160 may be redundantly stored on each disk 155 of the SSP 150, or the database 160 may be distributed across the disks 155. Further, it will be understood by one skilled in the art that the database 160 may be a relational database or various other storage objects capable of maintaining data as described herein.

In some embodiments of the invention, the orchestrator 110, or orchestration node, manages the health data collected from the various VMs 120. The orchestrator 110 may be a specialized node responsible for some or all aspects of disaster recovery for the various VMs 120. The orchestrator 110 may be in communication with the SSP 150 so as to access the database 160 as needed. In some embodiments of the invention, the orchestrator 110 is remote from the SSP 150. For example, the orchestrator 110 may be incorporated into a management system on a remote server. The orchestrator 110 may be hardware, software, or a combination of both. For instance, in some embodiments of the invention, the orchestrator 110 takes the form of software running on a remote server. However, alternatively, the orchestrator 110 may be a specialized hardware device, firmware, or a combination of hardware and software.

Some embodiments of the remediation system 100 include a VM agent 125 in each VM 120 as well as a VIOS agent 145 in each VIOS 140. In some embodiments of the invention, a VM agent 125 is a daemon running in a respective VM 120, and a VIOS agent 145 is a daemon running in a respective VIOS 140. Alternatively, however, a VM agent 125 may be incorporated into the code of the VM 120, and analogously, a VIOS agent 145 may be incorporated into the code of the VIOS 140. Generally, each VM agent 125 may be in communication with the VIOS agent 145 of its associated VIOS 140, which manages the I/O resources for that VM 120. Each VIOS agent 145 may be able to communicate with the respective VM agents 125 of its VMs 120 through an API for VIOS-VM communications. In some embodiments of the invention, communications between VMs 120 and their associated VIOS 140 are in extensible markup language (XML), but it will be understood that other languages may additionally or alternatively be used. Generally, activities described herein as being performed by a VIOS 140 for operation of the remediation system 100 may be performed by the respective VIOS agent 145, and activities described herein as being performed by a VM 120 for operation of the remediation system 100 may be performed by the respective VM agent 125.

In some embodiments of the invention, each VIOS 140 detects health data describing its associated VMs 120. More specifically, for instance, each VM agent 125 may communicate to its associated VIOS 140 health data describing the health of the respective VM 120, and the VIOS agent 145 may receive this health data. The VM agent 125 may be aware of this health data due to operating on the VM itself. The health data collected and communicated to the VIOS 140 may include one or more of the following, for example: a heartbeat indicating that the VM 120 is running, an indication of which applications are running on the VM 120, and a respective heartbeat of each application running on the VM 120. The VM agent 125 may communication this health data to the VIOS 140 according to a predetermined schedule. For example, and not by way of limitation, the health data may be communicated periodically at established intervals (e.g., every two seconds), or the health data may be continuously communicated in a data stream. It will be understood that various schedules may be used for the communication of this health data.

Each VIOS agent 145 may thus receive from its various VMs 120 the health data describing those VMs 120. Each VIOS agent 145 may communicate to the orchestrator 110 the various health data received from its associated VMs 120. In some embodiments of the invention, each VIOS 140 communicates with the orchestrator 110 in XML, but it will be understood that other languages may additionally or alternatively be used. Each VIOS agent 145 may communicate the health data of its VMs 120 to the orchestrator 110 according to a predetermined schedule, which may be based on the schedule on which the health data is reserved from the VMs 120. For example, and not by way of limitation, a VIOS agent 145 may transmit the health data of the associated VMs 120 to the orchestrator 110 periodically at established intervals, or that health data may be continuously communicated in a data stream. It will be understood that various schedules may be used for the communication of this health data.

The orchestrator 110 may, therefore, receive from the VMs 120, through the VIOSes 140, the health data describing the various VMs 120. The orchestrator 110 thus detects health data of the various VMs 120 connected to the VIOSes 140 participating in the SSP 150. More specifically, to detect this health data, the orchestrator 110 communicates with the VIOSes 140 to receive the health data. To this end, the orchestrator 110 may utilize an existing application programming interface (API) to instruct the above-described communications between each VIOS 140 and its associated VMs 120. The orchestrator 110 may store the collected health data in the database 160. For example, and not by way of limitation, the health data of the VMs 120 may be stored in a database catalog of the database 160, or the health data may be stored in one or more tables of the database 160.

In some embodiments of the remediation system 100, the health data in the database 160 is updated dynamically as the health of the VMs 120 changes, and further, the health data may be updated in real time or near real time. In other words, the VM agent 125 of a VM 120 detects health data specific to that VM 120 and transmits that health data to the associated VIOS 140, which transmits that health data to the orchestrator 110, which updates the database 160 to incorporate the health data. Thus, according to some embodiments of the invention, as the health data of that VM 120 changes, the database 160 is updated to indicate the changes.

In some embodiments of the invention, as needed, the orchestrator 110 can query a VIOS 140 regarding a VM 120 associated with that VIOS 140. For instance, if the health data of a VM 120 is deemed anomalous (e.g., if an expected heartbeat is missing), the orchestrator 110 may decide to gather more information about that VM 120 in order to remediate a potential issue with that VM 120. The query may instruct the VIOS 140 to communicate with the VM 120 through the API to request additional information or to perform remedial tasks. As a result of receiving such a query, the VIOS agent 145 may communicate with the VM agent 125 to update the orchestrator 110 with the most recent health data of the VM 120 referenced in the query. Further, in some embodiments of the invention, such a query may ask for different or more specific information about a referenced VM 120, as compared to what was included in prior-provided health data. In that case, the VIOS agent 145 may communicate with the VM agent 125 to obtain the health data requested. Additionally, it will be understood that the orchestrator 110 may query a VIOS 140 about more than a single VM 120 associated with that VIOS 140 at a time, or may query multiple VIOSes 140 at a time, and in that case, the one or more VIOSes 140 queried may return the requested health data to the orchestrator 110.

In some embodiments of the invention, the remediation system 100 leverages the SSP 150 to gather and store VM health data and to provide centralized access to that health data in the form of the orchestrator 110 and the database 160. The orchestrator 110 may access the database 160 to monitor the health of the VMs 120, whose health data is stored there. As such, the orchestrator 110 may evaluate the health of the various VMs 120. For example, and not by way of limitation, the orchestrator 110 may have access to a set of established policies that set operating parameters (e.g., thresholds) for the health data. The orchestrator 110 may compare the health data of each VM 120 to these policies to determine whether the health data falls within expected operating parameters. If a VM's health data falls outside the expected operating parameters, then the orchestrator 110 may deem the VM 120 to be operating anomalously. As a result, the orchestrator 110 may initiate a remedial action. For example, and not by way of limitation, a remedial action may include one or more of the following: querying the VM 120 for additional health information, allocating additional resources to the VM 120, restarting one or more applications on the VM 120, restarting the VM 120, restarting an application on a different VM 120, taking the VM 120 offline, or notifying an administrator of a detected anomaly in operation of the VM 120.

Figure 2:
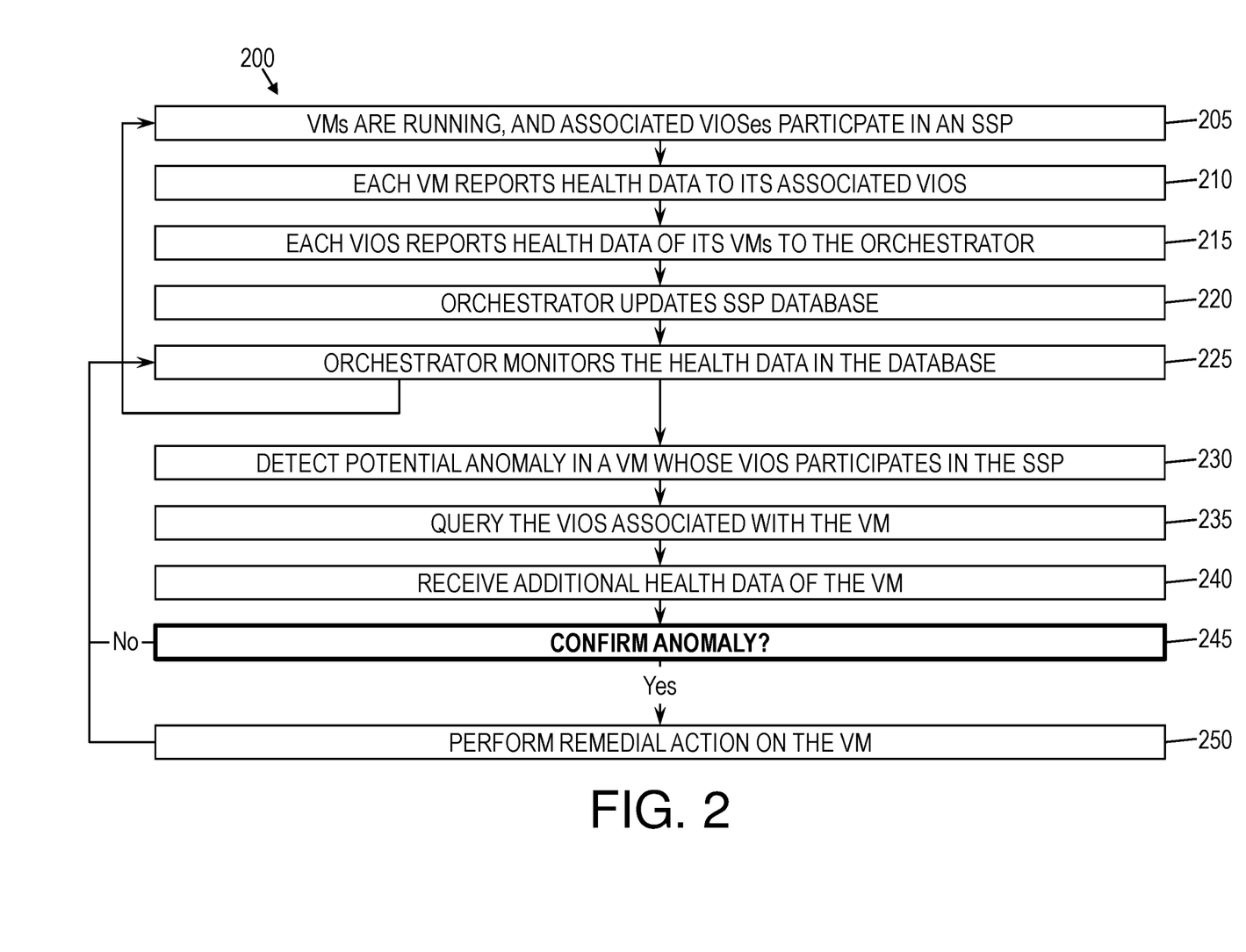
FIG. 2 is a flow diagram of a method of monitoring virtual machines through the remediation system, according to some embodiments of this invention.

FIG. 2 is a flow diagram of a method 200 of monitoring virtual machines 120 through the remediation system 100, according to some embodiments of this invention. As shown in FIG. 2, at block 205, various VMs 120 are running, and their associated VIOSes 140 participate in an SSP 150. At block 210, each VM agent 125 reports the health data of its respective VM 120 to the VIOS 140 associated with that VM 120. At block 215, each VIOS 140 transmits the health data of its associated VMs 120 to the orchestrator 110, which may be common to all VIOSes 140 in the SSP 150. At block 220, the orchestrator 110 updates the SSP database 160 with the received health data of the various VMs 120 associated with VIOSes 140 participating in the SSP 150. At block 225, the orchestrator 110 monitors the health data to determine whether any of the VMs 120 are operating outside expected parameters. In some embodiments of the invention, blocks 205 through 225 of the method 200 represents an ongoing state, which is shown by an arrow extending from block 225 and returning to block 205.

At block 230, the orchestrator 110 may detect a potential anomaly in the health data of a VM 120. For example, and not by way of limitation, the orchestrator 110 may determine that an aspect of the health data of the VM 120 falls outside an expected range, and the orchestrator 110 may recognize this as a potential anomaly.

At block 235, responsive to the potential anomaly in the VM 120, the orchestrator 110 queries the VIOS 140 associated with the VM 120 for additional health data describing the VM 120. In some embodiments of the invention, the orchestrator 110 decides what additional health data to request based at least in part on the health data already received for the VM 120. The additional health data requested may differ from the health data already received in one or more respects. For example, and not by way of limitation, the additional health data may be finer (e.g., more precise, less granular) than the health data already received. In some embodiments of the invention, the additional health data requested may be tailored based on the potential anomaly, such that the additional health data, when received, may be useful in confirming or denying that the VM 120 is operating in an anomalous state.

When the VIOS 140 receives the query, the respective VIOS agent 145 communicates the request for additional health data to the VM agent 125, which may gather the additional health data from the VM 120 and return the additional health data to the VIOS agent 145. The VIOS agent 145 may then return the additional health data to the orchestrator 110 in response to the query.

At block 240, the orchestrator 110 receives from the VIOS 140 the additional health data requested regarding the VM 120. At decision block 245, the orchestrator 110 evaluates the additional health data to determine whether the VM 120 is indeed operating outside expected parameters and, thus, anomalously. If the orchestrator 110 determines that the VM 120 is not operating anomalously, then the method 200 returns to block 225, where the orchestrator 110 continues monitoring the health data of the various VMs 120. However, if the orchestrator 110 determines that the VM 120 is operating anomalously, then the orchestrator 110 performs a remedial action at block 250. The method 200 then returns to block 225, where the orchestrator 110 continues monitoring the health data.

Figure 3:
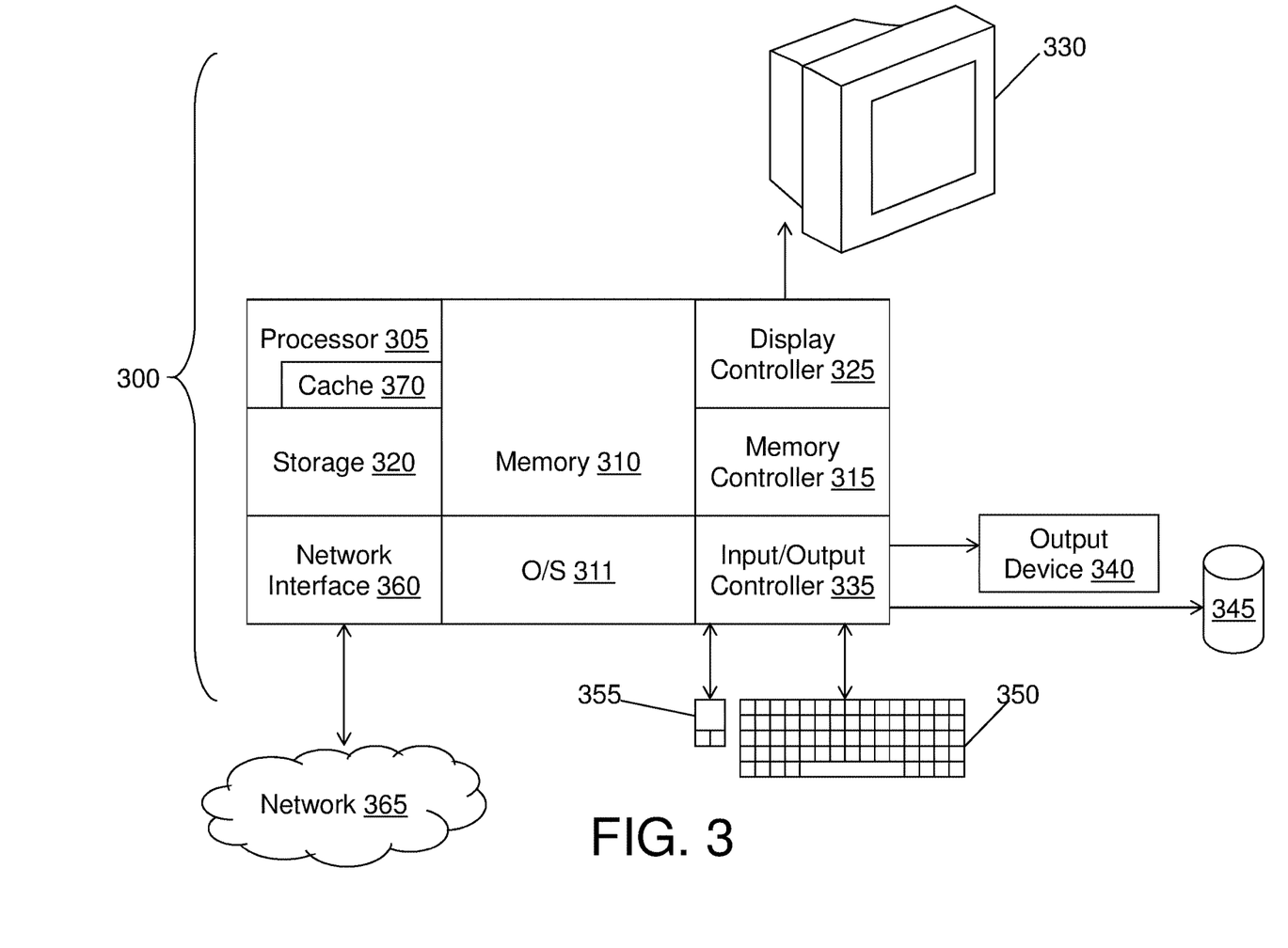
FIG. 3 is a diagram of a computer system for implementing some or all aspects of the remediation system, according to some embodiments of this invention.

FIG. 3 is a diagram of a computer system 300 for implementing some or all aspects of the remediation system 100, according to some embodiments of this invention. The remediation systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, the orchestrator 110 may be implemented as one or more computer systems 300 or portions thereof, and each of the VIOSes 140 and the VMs 120 may run on one or more computer systems 300 or portions thereof.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the remediation systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Remediation systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
    a plurality of virtual machines (VMs);
    two or more virtual input/output servers (VIOSes) participating in a shared storage pool (SSP), wherein each VIOS in the SSP is associated with a respective set of VMs of the plurality of VMs;
    wherein each VM is configured to transmit respective health data describing the VM to its associated VIOS, wherein the health data includes a heartbeat indicating that the VM is running, an indication of which applications are running on the VM, and a respective heartbeat of each application running on the VM; and
    an orchestration node in communication with each of the two or more VIOSes participating in the SSP, wherein each VIOS is configured to transmit to the orchestration node the respective health data of each VM in the respective set of VMs associated with the VIOS; and
    wherein the orchestration node is configured to monitor health of a plurality of VMs associated with the two or more VIOSes participating in the SSP to detect an anomaly in the respective health data of a first VM, and to perform a remedial action on the first VM responsive to the anomaly, the remedial action including one or more of allocating additional resources to the first VM, restarting one or more applications on the first VM, restarting the first VM, restarting an application on a different VM, and taking the first VM offline.

2. The system of claim 1, wherein, to monitor the health of the plurality of VMs, the orchestration node is further configured to:
    store, in a database associated with the SSP, respective health data of each VM in the plurality of VMs associated with the two or more VIOSes participating in the SSP; and
    monitor the health of the plurality of VMs based on the database.

3. The system of claim 2, wherein the SSP is a shared pool of one or more disks useable by the two or more VIOSes, and wherein the database indicates at least an allocation of the one or more disks among the two or more VIOSes.

4. The system of claim 3, wherein the respective health data of each VM in the plurality of VMs associated with the two or more VIOSes participating in the SSP is stored in a catalog of the database.

5. The system of claim 1, wherein the SSP is a shared pool of two or more disks useable by the two or more VIOSes, and wherein, to monitor the health of the plurality of VMs, the orchestration node is further configured to:
    store, in a distributed database that is distributed across the two or more disks of the SSP, respective health data of each VM in the plurality of VMs associated with the two or more VIOSes participating in the SSP; and
    monitor the health of the plurality of VMs based on the distributed database.

6. A computer-implemented method comprising:
    receiving, at an orchestration node, from two or more virtual input/output servers (VIOSes) participating in a shared storage pool (SSP), a respective set of health data from each VIOS describing a respective set of virtual machines (VMs) associated with the VIOS;
    wherein the respective set of health data received from a first VIOS describes two or more VMs associated with the first VIOS, wherein the set of health data includes a heartbeat indicating that the VM is running, an indication of which applications are running on the VM, and a respective heartbeat of each application running on the VM; and
    monitoring, at the orchestration node, health of a plurality of VMs associated with the two or more VIOSes participating in the SSP to detect an anomaly in the respective health data of a first VM, and to perform a remedial action on the first VM responsive to the anomaly, the remedial action including one or more of allocating additional resources to the first VM, restarting one or more applications on the first VM, restarting the first VM, restarting an application on a different VM, and taking the first VM offline.

7. The computer-implemented method of claim 6, wherein the monitoring the health of the plurality of VMs comprises:
    storing, in a database associated with the SSP, respective health data of each VM in the plurality of VMs associated with the two or more VIOSes participating in the SSP; and
    monitoring the health of the plurality of VMs based on the database.

8. The computer-implemented method of claim 7, wherein the SSP is a shared pool of one or more disks useable by the two or more VIOSes, and wherein the database indicates at least an allocation of the one or more disks among the two or more VIOSes.

9. The computer-implemented method of claim 8, wherein the respective health data of each VM in the plurality of VMs associated with the two or more VIOSes participating in the SSP is stored in a catalog of the database.

10. The computer-implemented method of claim 6, wherein the SSP is a shared pool of two or more disks useable by the two or more VIOSes, and wherein the monitoring the health of the plurality of VMs comprises:
    storing, in a distributed database that is distributed across the two or more disks of the SSP, respective health data of each VM in the plurality of VMs associated with the two or more VIOSes participating in the SSP; and
    monitoring the health of the plurality of VMs based on the distributed database.

11. A computer-program product for monitoring the health of virtual machines associated with a shared storage pool, the computer-program product comprising a computer-readable storage medium having program instructions embodied therewith, the program instructions executable by a processor to cause the processor to perform a method comprising:
    receiving, at an orchestration node, from two or more virtual input/output servers (VIOSes) participating in a shared storage pool (SSP), a respective set of health data from each VIOS describing a respective set of virtual machines (VMs) associated with the VIOS;
    wherein the respective set of health data received from a first VIOS describes two or more VMs associated with the first VIOS, wherein the set of health data includes a heartbeat indicating that the VM is running, an indication of which applications are running on the VM, and a respective heartbeat of each application running on the VM; and
    monitoring, at the orchestration node, health of a plurality of VMs associated with the two or more VIOSes participating in the SSP to detect an anomaly in the respective health data of a first VM, and to perform a remedial action on the first VM responsive to the anomaly, the remedial action including one or more of allocating additional resources to the first VM, restarting one or more applications on the first VM, restarting the first VM, restarting an application on a different VM, and taking the first VM offline.

12. The computer-program product of claim 11, wherein the monitoring the health of the plurality of VMs comprises:
    storing, in a database associated with the SSP, respective health data of each VM in the plurality of VMs associated with the two or more VIOSes participating in the SSP; and
    monitoring the health of the plurality of VMs based on the database.

13. The computer-program product of claim 12, wherein the SSP is a shared pool of one or more disks useable by the two or more VIOSes, and wherein the database indicates at least an allocation of the one or more disks among the two or more VIOSes.

14. The computer-program product of claim 13, wherein the respective health data of each VM in the plurality of VMs associated with the two or more VIOSes participating in the SSP is stored in a catalog of the database.

15. The computer-program product of claim 11, wherein the SSP is a shared pool of two or more disks useable by the two or more VIOSes, and wherein the monitoring the health of the plurality of VMs comprises:
    storing, in a distributed database that is distributed across the two or more disks of the SSP, respective health data of each VM in the plurality of VMs associated with the two or more VIOSes participating in the SSP; and
    monitoring the health of the plurality of VMs based on the distributed database.

* * * * *